No. 772,242. PATENTED OCT. 11, 1904.
A. M. LEVIN.
TURBINE.
APPLICATION FILED FEB. 1, 1904.
NO MODEL. 3 SHEETS—SHEET 2.
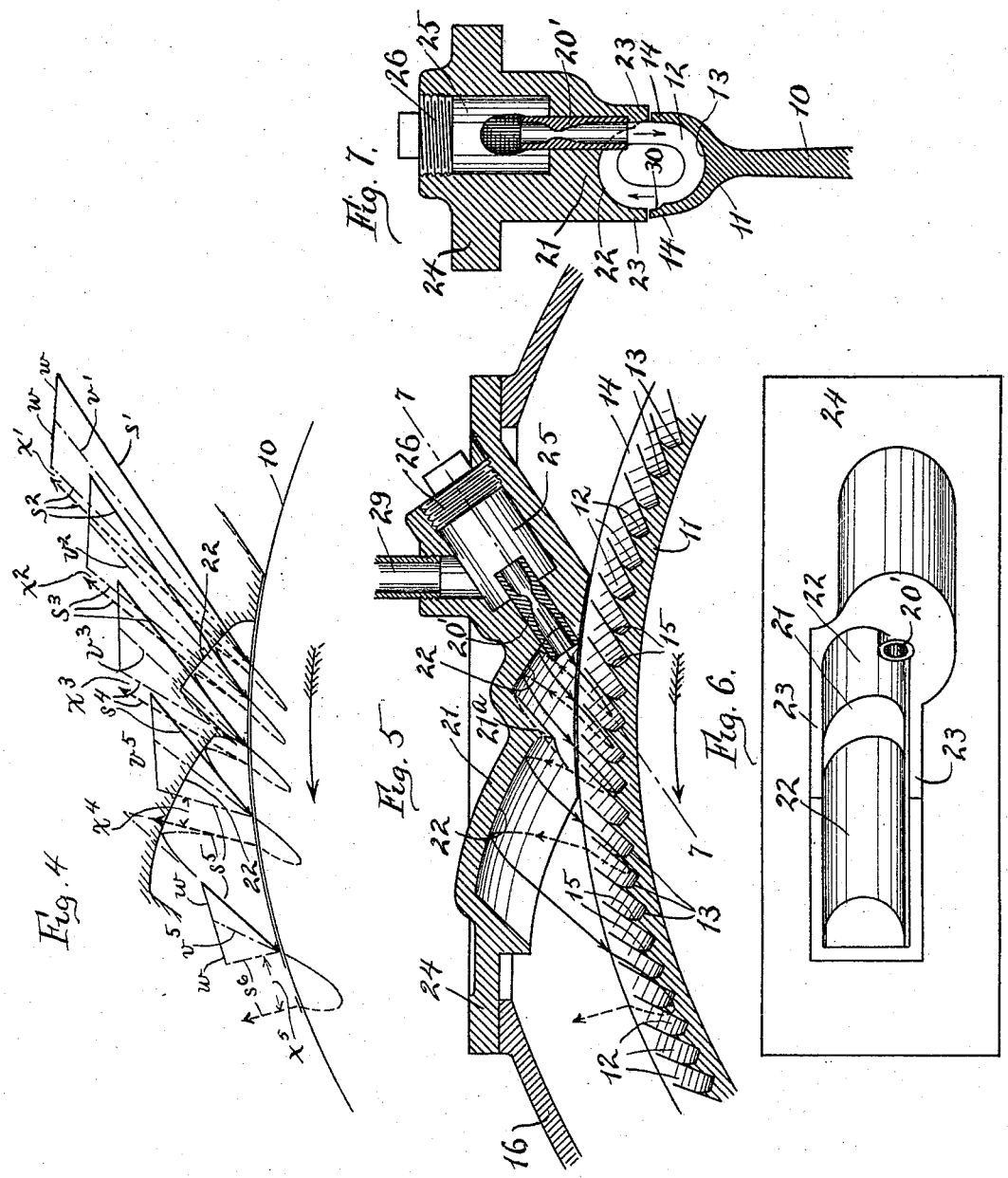
Witnesses:
Lillian Prentice
Alberta Adamick
Inventor:
Arvid M. Levin
By Pierce & Fisher
his Attorneys.

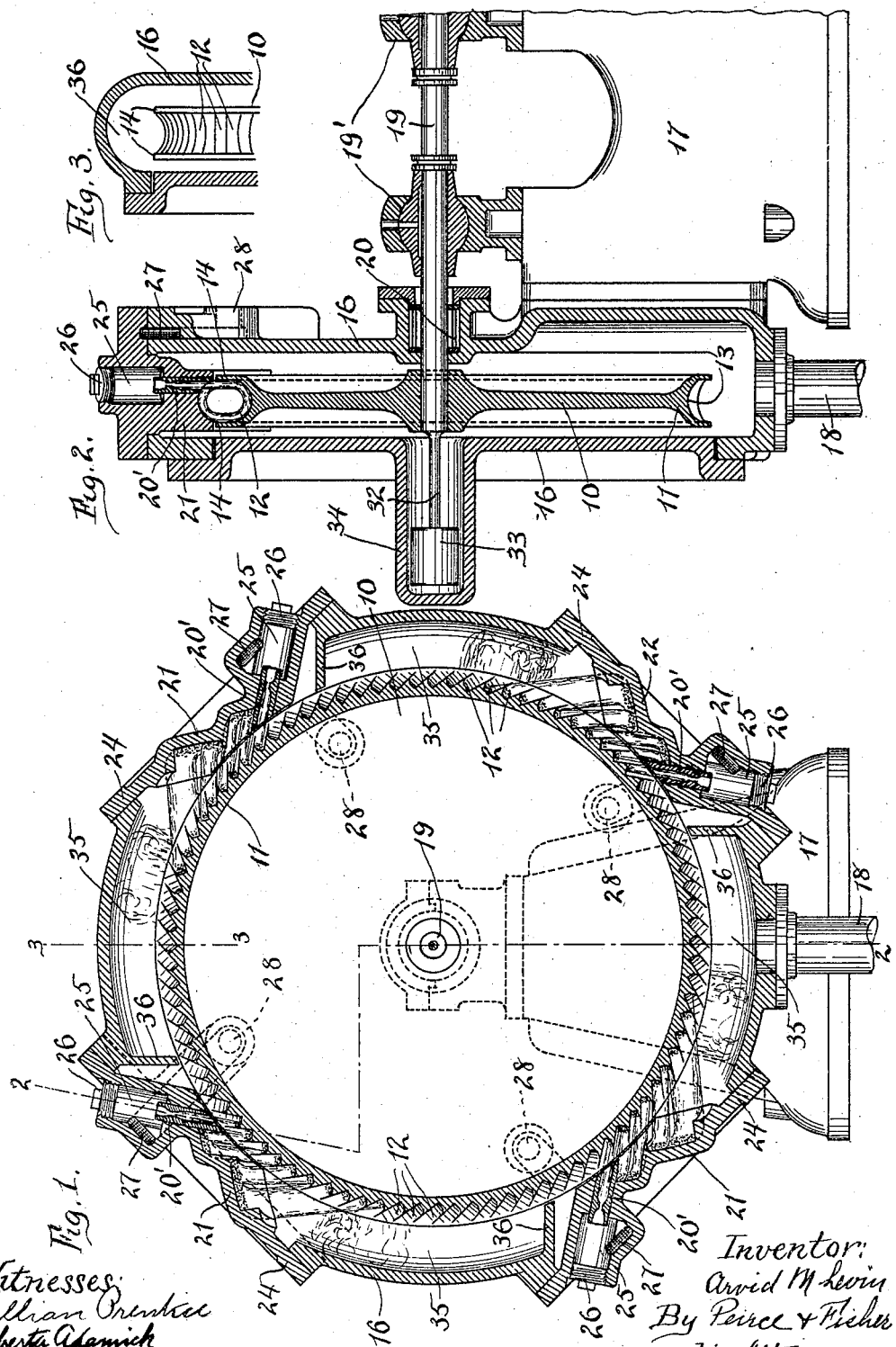

No. 772,242. PATENTED OCT. 11, 1904.
A. M. LEVIN.
TURBINE.
APPLICATION FILED FEB. 1, 1904.
NO MODEL. 3 SHEETS—SHEET 3.
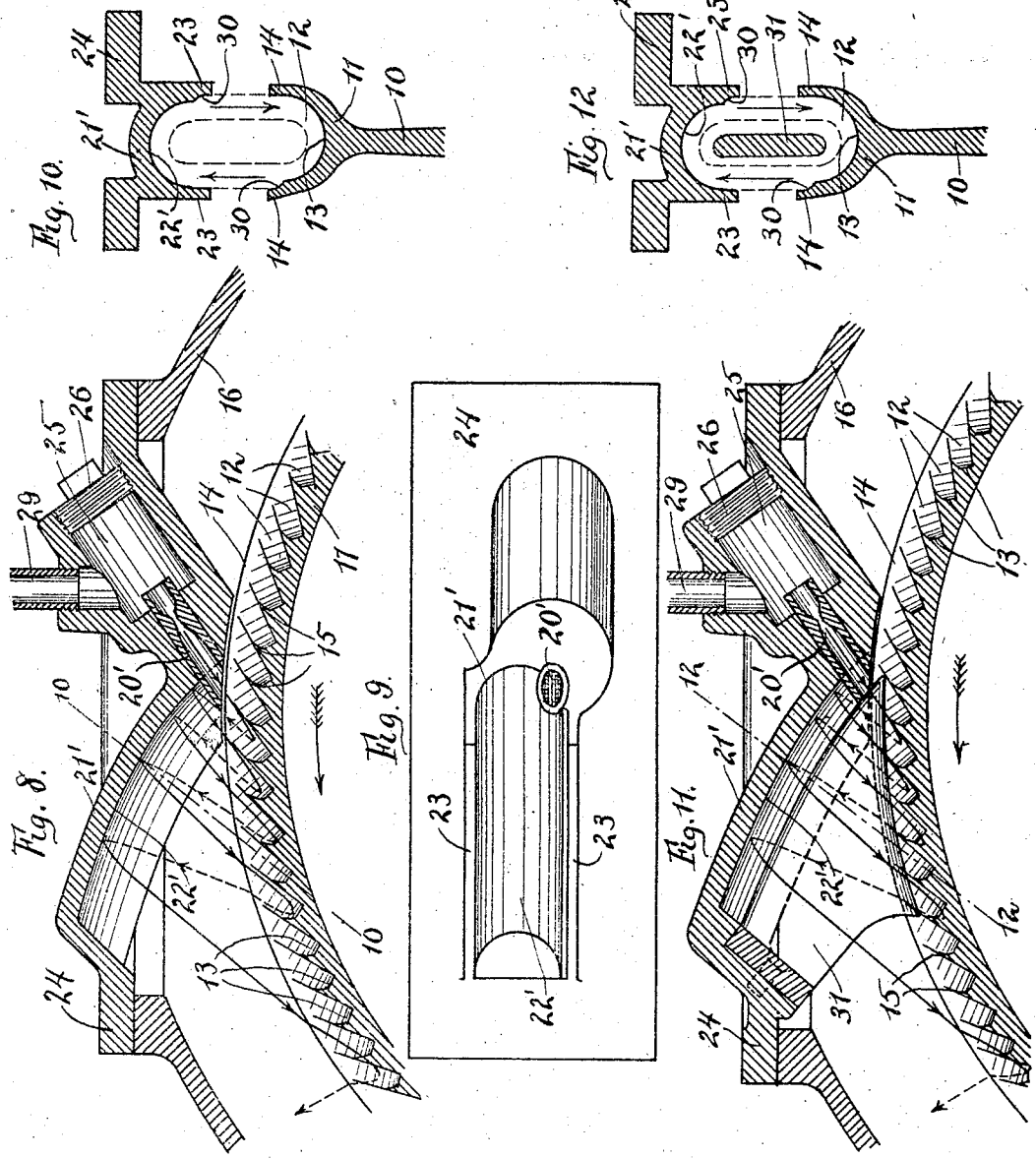
Witnesses:
Lillian Prentice
Alberta Adamick
Inventor:
Arvid M. Levin
By Peirce + Fisher
his Attorneys.

No. 772,242.  
Patented October 11, 1904.

UNITED STATES PATENT OFFICE.

ARVID M. LEVIN, OF JOLIET, ILLINOIS.

TURBINE.

SPECIFICATION forming part of Letters Patent No. 772,242, dated October 11, 1904.

Application filed February 1, 1904. Serial No. 191,487. (No model.)

*To all whom it may concern:*

Be it known that I, ARVID M. LEVIN, a subject of the King of Sweden and Norway, and a resident of Joliet, county of Will, and State of Illinois, have invented certain new and useful Improvements in Turbines, of which the following is declared to be a full, clear, and exact description.

The improvement relates to turbines in which the steam or other motor fluid is expanded in the admission-nozzle to the exhaust-pressure, and the invention seeks to provide efficient means for effecting successive or multiple passage of the expanded steam or gas through the turbine-wheel to utilize the energy due to its high velocity.

The invention consists in the features of construction, arrangements, and combinations of parts hereinafter set forth, illustrated in the accompanying drawings, and more particularly pointed out in the appended claims.

In the drawings, Figure 1 is a vertical section of the improved turbine. Fig. 2 is a cross-section on line 2 2 of Fig. 1. Fig. 3 is a detail section on line 3 3 of Fig. 1. Fig. 4 is a diagram of the operation of the expanded steam or other gas. Fig. 5 is an enlarged section of a portion of the turbine-wheel and casing. Fig. 6 is an inverted plan view of parts shown in Fig. 5. Fig. 7 is a detail section on line 7 7 of Fig. 5. Figs. 8 and 9 are views similar to Figs. 5 and 6, illustrating a modification. Fig. 10 is a section on line 10 10 of Fig. 8. Fig. 11 is a view similar to Figs. 5 and 8, illustrating a further modification. Fig. 12 is a section on line 12 12 of Fig. 11.

As well understood, with turbines in which the steam only passes once through the buckets of the wheel the velocity of the buckets must be one-half that of the steam to obtain maximum efficiency; but high-pressure steam when expanded into a vacuum or to atmospheric pressure attains a velocity of from three thousand to five thousand feet per second and, to operate with maximum economy, a single impact-wheel must rotate far beyond the limits of strength of material. Moreover, there is considerable difficulty in gearing down such high speeds for effectual utilization; but if the steam is caused to pass through the wheel a number of times to gradually absorb its velocity then the peripheral speed of the wheel may be comparatively low. For example, if the velocity of the steam delivered from the nozzle is three thousand feet per second and is passed five times through the buckets of the wheel the latter would, with a velocity of three hundred feet per second and under ideal conditions, attain the theoretical maximum economy. Ideal conditions may be approximated in a multiple-impulse turbine having a comparatively low speed if the frictional resistance to the flow of the current of steam is minimized by making the buckets and guide-surfaces small and by arranging them so that the steam strikes thereon and its direction of motion changed without shock and so that its course is free and unobstructed. Moreover, means must be provided for permitting the free expansion of the current of steam as its velocity is gradually decreased. Multiple-impulse wheels heretofore designed have employed a number of rows of buckets against which the steam successively strikes. Here the frictional surfaces are large. In others channels or buckets are so arranged in a single wheel and in the surrounding casing that a confined helical path is formed for the current of steam. In this case, too, the frictional surfaces are large, the flow of the current is confined and restricted, it is difficult to provide for the proper increase in cross-section of the flowing current, and the helical channels cannot be easily constructed and provided with a smooth finished surface.

In accordance with the present invention the wheel-buckets and reversing-guides are arranged to form a working space open from end to end in which the steam from the nozzle proceeds in successive helical whirls of gradually-decreasing velocity and with the successive portion in contact and parallel, so that, in effect, the steam enters and leaves the wheel-buckets and reversing-guides in a continuous sheet. By this arrangement the successive portions of the whirling sheet guide one another without loss of energy and the necessity of helical or other separating partitions or channels is avoided.

The turbine-wheel 10 may be constructed in any suitable manner. As shown, the wheel is a solid cast disk having an enlarged peripheral portion 11, within which the buckets 12 are formed. The buckets preferably lie in the median plane of the wheel and are inclined both radially and tangentially. The working or guide surfaces 13 of the buckets are semicylindrical in outline, and extended flanges 14, tangential to the working faces, guide the motor fluid as it enters and leaves the buckets. It will be observed that the buckets are arranged step-like on the periphery of the wheel and that they open outwardly and into one another, so that the steam may enter and leave the buckets with little friction. For the same reason the buckets are not separated by partitions, though small overhanging lips 15 may be provided at the outer ends of the guide-surfaces 13, if desired. Wheel 10 is preferably inclosed within a suitable casing 16, the side and edge walls of which are spaced apart from the wheel, as indicated in Fig. 3. Casing 16 is mounted on the bed 17 and is provided with an exhaust-pipe 18, which may, if desired, lead to a condenser.

The motor-shaft 19 is journaled in suitable bearings 19' upon the bed 17, extends through a suitable stuffing-box 20 in the side wall of the casing 16, and carries the turbine-wheel 10 upon its end. One or more inlet-nozzles 20', in accordance with the size of the wheel, are disposed about its periphery. Four of these nozzles are shown, and they are of proper proportion as to relative size of orifice and outlet and of proper form to totally expand the steam to the pressure of the exhaust. Nozzles 20' are inclined, as shown, to the path of movement of the wheel-buckets 12 and arranged to deliver the steam into the inlet side of the open buckets and at right angles to their working or guide surfaces 13. From each of the nozzles a reversing-guide 21 extends outwardly over a number of the buckets of the wheel, the working or guiding face 22 of which is semicylindrical in outline, and extended flanges 23 guide the steam as it enters and leaves in tangential direction. The nozzles 20' and reversing-guides 21 are preferably carried upon suitable bonnets 24, removably secured in place over openings formed at intervals in the periphery of the casing 16. The reversing-guides 21 are preferably cast in piece with the bonnets 24, while the nozzles 20' are formed separate therefrom and lead from chambers 25, formed in the bonnets. These chambers 25 are closed at their outer ends by screw-plugs 26, which may be removed for convenience in putting the nozzles 20' in place or for removing them, if necessary. In the form shown in Fig. 1 inlet-channels 27, cast in the body of the bonnets 24 and in the wall of the casing 16, connect the several chambers 25 with a series of pipe-inlets 28. In the forms shown in Figs. 5, 8, and 11 the inlet-pipe 29 leads directly into the chamber 25. The outlets of the nozzle 20' and the adjacent portions of flanges 23 on the reversing-guides extend closely adjacent the periphery of the wheel, and the semicylindrical guide-surfaces 22 are opposed to the semicylindrical guide 13 of the wheel-buckets.

In operation the steam from nozzle 20' enters the inlet side of the wheel-buckets 12, and its direction of motion is reversed without shock by the working faces 13. The wheel advances a short distance as the steam passes through the buckets, so that the steam is delivered from the exhaust side of the wheel-buckets to the inlet side of the reversing-guide 21 beyond the nozzle. Here the guide-surface 22 again changes its direction of movement without shock and the steam is again projected into the buckets of the wheel. The steam from nozzle 20' thus proceeds in a succession of helical whirls of gradually-diminishing velocity and is successively projected by the reversing-guide back into the wheel-buckets until its velocity relatively to the wheel is consumed. The working face 22 of the reversing-guide 21 extends from the nozzle at such an angle to the path of movement of the wheel-buckets that the successive portions of steam are projected therefrom in substantially parallel lines and with a direction relatively to the wheel at right angles to the working faces of the buckets.

It will be observed that the reversing-guide 21 is open inwardly and from end to end, so that the flow of steam is free and unconfined, and the guide-surfaces are as small as possible. If a closed confined helical path were employed, the frictional surfaces would be large and the flow of steam checked, so that a disadvantageous back pressure would be developed which would resist the free expansion of the steam in the nozzle.

By the arrangement of buckets opening outwardly and the opposed reversing-guides opening inwardly a working space or chamber freely open from end to end is formed, and the steams enters and leaves the buckets in a continuous whirling sheet instead of in separated streams, as in prior constructions. The separate portions of the whirling sheet will of course have different velocities, but will be in contact, so that as the guide-surfaces project the succeeding portions in parallel relation with one another these succeeding portions will guide and confine one another and prevent the particles of steam from being dispersed in a tangentially or circumferential direction out of their proper path. This action is illustrated as clearly as possible in Fig. 1, on which the steam is indicated as a whirling sheet with the succeeding portions in contact. The arrows in the other figures indicate only the central lines of the succeeding whirls of steam. This arrangement does away with the necessity of separating partitions or of guide surfaces or channels arranged to form a closed helical path, thus materially reducing the "skin" friction. The friction of the particles of steam upon one another, as well understood, is not deleterious. Moreover, any guides or partitions arranged to form a closed helical path are of necessity very difficult to construct and cannot be conveniently machined to a smooth finish. The semicylindrical working faces of the open buckets and guides in the present turbine are easily formed and machined by milling cutters to form smooth surfaces which will guide the steam without shock and with little friction. What little friction there is will only serve to heat the buckets and guides and prevent condensation.

The reversing-guide extends, as shown, from the nozzle 20' over the wheel-buckets and at an angle to the path of their movement, and the guide-surface 22 beyond the nozzle is located farther and farther away from the wheel-buckets, so that an expansion-space or working-chamber is formed, increasing in width radially of the wheel, and ample provision thus made for the free increase in cross-section of the steam-current, due to its decrease in velocity.

In the simplest form the working surface 22' of the reversing-guide 21' is unbroken, as shown in Figs. 8 and 11, and is slightly curved from end to end. Preferably, however, the reversing-guide 21 and its working surface are stepped, as shown in Figs. 1, 4, 5, and 6, so that the current of steam will not have so far to travel and will be less likely to overflow; but in either case a free unobstructed path with small guide-surfaces is provided and ample provision made for the increasing cross-section of the steam-current. The parts of the stepped guide 21 shown in Figs. 1 and 5 are not separated by a partition, but the guide is open from end to end, although a small guide-lip $21^a$ may be located at the shoulder, as shown.

The diagram of Fig. 4 and the arrows in the other figures illustrate the operation of steam when the velocity of the wheel-buckets is about one-tenth that of the initial velocity of the steam, in which case the steam-current must pass five times through the wheel-buckets for maximum economy. In Fig. 4 $s'$ is the initial absolute velocity and direction of the steam, $w$ is the velocity and direction of the wheel-buckets, and $v'$ is the velocity and direction of the steam relative to the buckets, and $s^2$ is the velocity and direction of the steam as it leaves the wheel-buckets; but, as the steam passes through the buckets, the wheel advances a short distance $x$, so that absolute direction is indicated by heavy dotted line $s^2$. The steam then strikes guide-surface 22 at an angle and is returned into the wheel-buckets with an absolute direction and velocity indicated by full line $s^2$. This action is repeated, the steam successively leaves the buckets, and is returned thereto with the gradually-diminishing absolute velocities and directions $s^3$, $s^4$, and $s^5$, and is successively projected against the wheel-buckets with relative velocity $v^2$, $v^3$, $v^4$, and $v^5$. The dot-and-dash lines and the heavy dot line $s^2 s^3$, &c., indicate the absolute velocity and direction of the steam delivered from the wheel-buckets, and the spaces $x^2 x^3$, &c., between such lines indicate the distance the buckets have traveled as the steam passes through them. The full lines $s^2 s^3$, &c., indicate the absolute velocity and direction of the steam as returned to the buckets by the reversing-guide. As indicated in the diagram, the final direction $s^6$ of the steam is radial to the wheel, and the relative velocity is of course zero, and the steam then escapes into the exhaust-space.

In the construction shown, the steam passes first from the nozzle into the wheel-buckets and is subsequently projected four times from the guide-surface 22' of the form shown in Figs. 8 and 11 and twice from each of the working surfaces 22 of reversing-guide 21, (shown in Figs. 1 and 5,) making five times in all that the steam traverses the buckets of the wheel. The arrangement is designed for a wheel having a peripheral velocity of one-tenth that of the initial velocity of the steam. It is obvious that the guides may be modified to project the steam a greater or less number of times in accordance with the relative speed of the steam and wheel-buckets. Indeed, the construction shown without modification will accommodate itself within wide limits to varying speeds of the wheel and steam, and the course of the steam may vary in accordance therewith, since the construction permits a free unobstructed flow and does not confine the steam to a precise predetermined path. As the direction of the steam-current is reversed in the buckets and guides it is somewhat compressed by centrifugal force in the bottoms of the buckets and guides, as indicated in Figs. 7, 10, and 12. As it leaves the buckets and guides in a direction tangential to the working surfaces thereof it tends to reëxpand and become ineffectually deflected from its true course. The succeeding parallel portions of the whirling sheet of steam in contact as it leaves the exhaust side of the buckets and guide prevent deflection of the particles of steam in a circumferential direction from such expansion and obviate the necessity of helical partitions. In axial direction the steam is allowed to reëxpand by cutting away the flanges 14 and 23 of the buckets and guides on the exhaust sides of the same, as indicated at 30 in Figs. 7, 10, and 12. The flanges 14 and 23 upon the inlet sides of the buckets and guides are set to receive the steam without shock from the cut-away exhaust or outlet sides. By thus allowing for the reëxpansion of the steam after its slight compression in the bottom of the buckets and guides the tendency of the steam to escape outwardly in axial direction is overcome and the steam will not be deflected inwardly against the current of steam flowing in the opposite direction at the other side of the buckets and guides. To prevent the latter action, a triangular-shaped partition 31 (see Figs. 11 and 12) may be employed. This partition is fixed at its outer end to the reversing-guide and extends inwardly within the same. Such a partition will not increase the skin friction, since it is made so small that it will not lie in the normal path of the whirling sheet of steam nor come in contact therewith. (See Fig. 12.) This partition does not in any way obstruct the inlet or exhaust passages on opposite sides of the buckets and guides, which, as shown, are open and unobstructed from end to end of the guide.

In some multiple-impulse turbines the steam is arranged to work with constant speed and decreasing pressure or at constant pressure and decreasing velocity to absorb the *vis viva* of current or with a combination of the two. It is obvious that the construction described with the chamber or space between the reversing-guide and wheel-buckets open from end to end, in which the steam proceeds in a succession of helical whirls, can only be employed for absorbing the *vis viva* of a current of steam of constant pressure and of decreasing velocity and that total-expansion inlet-nozzles must be employed to obtain good economy. For maximum economy with a turbine of this type, the steam must be totally expanded, the course of the steam should be free and unobstructed and ample provision must be made for the increase in cross-section of the steam-current, or a disadvantageous back pressure will prevent proper expansion through the inlet-nozzle, the steam must be guided without shock to prevent inefficient dispersion of the particles, and the guide-surface must be small to avoid friction. In the present construction these conditions for maximum economy are met by the arrangement and construction of the expansion-nozzle, open buckets and reversing-guide extending from the nozzle over the buckets to form a working space or chamber open from end to end and in which the steam proceeds in a succession of helical whirls. At the same time the peripheral speed is comparatively low, (the turbine described is designed to have a peripheral speed of about three hundred feet per second, which is well within the limits of safety,) and the power may be taken directly from the motor-shaft without speed-diminishing gearing.

Even with the comparatively low peripheral speed it is desirable that the turbine-wheel should rotate in perfect balance—*i. e.*, about its center of gravity—to avoid pressure upon the bearing of the shaft. For this purpose the end of shaft 19, beyond the turbine-wheel 10 and in the side opposite to its supporting-bearing, is reduced in size, as at 32, is somewhat springy, and capable of slight deflection. A counterbalance-weight 33 is fixed to the end of the reduced shaft portion 32. At critical speed the counterbalance-weight deflects the shaft portion 32 until the center of gravity of the revolving parts coincides with the center of revolution, and the centrifugal forces will not cause a radial pressure upon the shaft-bearings and the revolving parts rotate in perfect balance. It will be observed that the casing 16 is extended, as at 34, to cover the end of the shaft, so that cross-sectional area of the shaft is exposed at one end to the exhaust-pressure and at the other end to the atmospheric pressure. If the turbine is run non-condensing, the nozzles are arranged, as shown, to deliver steam on the inner side of the wheel-bucket, and the axial pressure upon the shaft-bearing, due to the fact that the steam enters the bucket at one side of median plane of the wheel, will be balanced by the pressure of the exhaust upon the cross-sectional area of the shaft. If a condenser is employed, the nozzles 20 are arranged to deliver the steam into the outer sides of the wheel-buckets, and the axial pressure will be balanced by the atmospheric pressure upon the cross-sectional area of the shaft.

It is obvious that changes may be made in the details of structure without departure from the essentials of the invention. For example, the buckets and guides could be arranged on opposite sides of the wheel, near its periphery, instead of being on its edge and in the median plane, as shown. The latter is, however, the preferred arrangement, since the centrifugal force exerted upon the steam tends to keep it in its proper path. Preferably, as shown, the exhaust-spaces 35 about the periphery of the wheel are separated from the working spaces by partitions 36, so that exhaust-steam will not cool the nozzles and will not be drawn into the working spaces and interfere with the proper flow of the steam therein.

By the phrase "open from end to end" in the following claims is meant that the reversing-guide or the chamber or working space formed between the reversing-guide and the row of buckets has no cross-partitions for confining the current of steam. Preferably, also, as indicated, the reversing-guide is open to the exhaust-space, so that as soon as the *vis viva* of the steam is taken up it may freely escape without choking the incoming current.

While the working faces of the buckets and guides are preferably exactly semicylindrical in cross-section, since they may then be conveniently machined to a smooth finish it is not necessary that they should be of this exact geometrical form, since other curves which will guide the steam without shock may be employed.

The bonnets 24 may be adjusted tangentially upon their seats to a slight extent, and the nozzle and reversing-guides may thereby be arranged to present the proper angle to the wheel-buckets in accordance with the relative speed of the wheel-buckets and the steam-current from the nozzles.

Having described my invention, what I claim as new, and desire to secure by Letters Patent, is—

1. A multiple-impulse turbine comprising a wheel having a row of buckets, an expansion-nozzle delivering into said buckets and a stationary reversing-guide extending from said nozzle over a number of said buckets to form a space open from end to end within which the steam or other motive fluid proceeds in a helical whirl and is successively projected against the buckets of said wheel.

2. A multiple-impulse turbine comprising a wheel having a row of buckets, an expansion-nozzle delivering into one side of said buckets, a reversing-guide extending from said nozzle over a number of said buckets and arranged to form a working space freely open from end to end, said buckets and guides having opposed inclined working faces curved in cross-section and arranged to guide the current of fluid from said nozzle in a succession of helical whirls within said working space.

3. A multiple-impulse turbine comprising a wheel having a row of buckets, an expansion-nozzle delivering into one side of said buckets, and a reversing-guide extending from said nozzle over said row of buckets to form a working space open from end to end in which the current of steam from said nozzle proceeds in a helical whirl with its successive portions of decreasing velocity in contact.

4. A multiple-impulse turbine comprising a wheel having a row of outwardly-open buckets, an expansion-nozzle delivering into one side of said buckets and a reversing-guide extending from said nozzle over a number of said buckets, said guide being open inwardly from end to end and said guide and said buckets having opposed, inclined, semicylindrical working faces between which the current from said nozzle proceeds in a helical course.

5. A multiple-impulse turbine comprising a wheel having a row of step-like buckets opening outwardly and into each other, an expansion-nozzle delivering into one side of said buckets, and a reversing-guide extending from said nozzle over a number of said buckets, said guide being open inwardly from end to end and said guide and said buckets having opposed, inclined semicylindrical working faces for guiding the current of fluid from said nozzle.

6. A multiple-impulse turbine comprising a wheel having a row of outwardly-open buckets, an expansion-nozzle delivering into one side of said buckets, a stepped reversing-guide extending from said nozzle over a number of said buckets arranged to form a working space freely open from end to end, said guide and said buckets having opposed, inclined semi-cylindrical working faces bounding such space and arranged to guide the fluid from said nozzle parallel in a succession of helical whirls.

7. A multiple-impulse turbine comprising a wheel having a row of buckets, an expansion-nozzle delivering into one side of said buckets and a reversing-guide extending from said nozzle outwardly over a number of said buckets and arranged to successively return the current of fluid from said nozzle into said buckets, the inlet and exhaust sides of said reversing-guide being unobstructed from end to end.

8. A multiple-impulse turbine having a row of outwardly-open buckets, an expansion-nozzle delivering into one side of said buckets, an inwardly-open reversing-guide extending from said nozzle over said buckets, said buckets and guide having opposed, inclined semi-cylindrical working faces and guide-flanges extending tangentially to said working faces at the opposite sides of said guide and buckets.

9. A multiple-impulse turbine having a row of outwardly-open buckets, an expansion-nozzle delivering into one side of said buckets, an inwardly-open reversing-guide extending from said nozzle over said buckets, said buckets and guide having opposed, inclined semi-cylindrical working faces and guide-flanges extending tangentially to said working faces at the opposite sides of said guide and buckets, said flanges being cut away at the exhaust side to permit lateral expansion of the flowing current of fluid.

10. A multiple-impulse turbine comprising a wheel having a row of buckets, an expansion-nozzle delivering into one side of said buckets, a reversing-guide extending from said nozzle over a number of said buckets and arranged to form a working space or chamber freely open from end to end and to the exhaust-outlet, said buckets and guides having opposed, inclined working faces, curved in cross-section bounding said working space and arranged to guide the current of fluid from said nozzle in a helical whirl within said open space.

11. A multiple-impulse turbine comprising a wheel having a row of buckets, an expansion-nozzle delivering into one side of said buckets, and a reversing-guide extending from said nozzle over a number of buckets arranged to form a working space increasing in width in radial direction, said guide being arranged to successively return the current of steam from said nozzle into said buckets.

12. In a multiple-impulse turbine comprising a wheel having a row of buckets, an expansion-nozzle delivering into one side of said buckets, a reversing-guide extending from said nozzle over a number of said buckets, said guide and said buckets having opposed, inclined working faces for guiding the current of steam from said nozzle in a succession of helical whirls, the working faces of said guide beyond the nozzle being located farther and farther away from said buckets.

13. A multiple-impulse turbine comprising a wheel having a row of buckets, an expansion-nozzle delivering into one side of said buckets, a reversing-guide having a working face extending from said nozzle outwardly over a number of said buckets and at an angle to the path of movement thereof to form a space increasing in width radially of the wheel.

14. A multiple-impulse turbine comprising a wheel having a row of buckets, an expansion nozzle delivering into one side of said buckets and a reversing-guide extending outwardly from said nozzle over a number of said buckets and arranged to form a working chamber or space of increasing cross-section and freely open from end to end, said buckets and guide having opposed, inclined working faces semicylindrical in cross-section bounding said working space and arranged to guide the fluid from said nozzle in a whirling sheet with its successive portions of decreasing velocity in contact.

15. A multiple-impulse turbine comprising a wheel having a row of buckets, an inclosing casing, an extension-nozzle delivering into one side of said buckets, a reversing-guide on said casing extending from said nozzle outwardly over a number of said buckets and arranged to form a chamber or working space of increasing cross-section freely open from end to end and to the exhaust-space within said casing, said buckets and guide having opposed, inclined working faces, semicylindrical in section bounding said space and arranged to guide the current of steam from said nozzle in a succession of helical whirls.

16. A turbine comprising a wheel having a row of buckets, an inclosing casing for said wheel forming an exhaust-chamber, an exhaust-pipe connected to the exhaust-space within said casing, a nozzle delivering into one side of said buckets, and a shaft whereon said wheel is supported passing through one side only of said casing, the entire cross-sectional area of said shaft being exposed at its inner end to the exhaust-pressure within said casing and at its outer end to the atmospheric pressure, whereby the difference in the exhaust and atmospheric pressures upon the cross-sectional area of the shaft will balance the axial thrust.

17. A turbine comprising a wheel having a row of buckets, a nozzle delivering into one side of said buckets, a shaft whereon said wheel is mounted journaled on one side only of said wheel, and having a free end extending on the opposite side of said wheel and a counterbalance-weight on said free extended end.

18. A turbine comprising a wheel having a row of buckets, an expansion-nozzle delivering into one side of said buckets, a shaft whereon said wheel is mounted, journaled on one side only of said wheel, and having a free extending portion on the opposite side of said wheel reduced in cross-section and somewhat yielding, and a counterbalance-weight upon the end of said reduced, yielding portion.

19. A multiple-impulse turbine comprising a wheel having a row of buckets, a casing inclosing said wheel, an exhaust-pipe connected with said casing, a number of expansion-nozzles about the periphery of said wheel and delivering into one side of said buckets, a reversing-guide extending from each of said nozzles over a number of said buckets and to form a working space open from end to end in which the steam from the nozzles proceeds in a helical path, said working spaces being freely open to the exhaust-spaces at their outlet ends and partitions between the exhaust-spaces and the inlet ends of said working spaces.

20. A multiple-impulse turbine comprising a wheel having a row of buckets, a casing inclosing said wheel, an exhaust-pipe connected to said casing, a number of inlet-nozzles about the periphery of said wheel and delivering into one side of said buckets, reversing-guides extending from said nozzles over the wheel-buckets and arranged to successively project the fluid from said nozzles against the wheel-buckets, openings about the periphery of said casing and bonnets removably secured over said openings, said nozzles and said reversing-guides being mounted upon said bonnets.

ARVID M. LEVIN.

Witnesses:
ALBERTA ADAMICK,
LILLIAN PRENTICE.